United States Patent
Ruckert et al.

(10) Patent No.: US 6,755,732 B2
(45) Date of Patent: Jun. 29, 2004

(54) AIR FILTRATION SYSTEM FOR VEHICLE CABS

(75) Inventors: Dieter Ruckert, Reilingen (DE); Marc Philipp, Stuttgart (DE); Ewald Wagner, Bietigheim-Bissingen (DE)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 10/213,716

(22) Filed: Aug. 6, 2002

(65) Prior Publication Data

US 2003/0045225 A1 Mar. 6, 2003

(30) Foreign Application Priority Data

Aug. 28, 2001 (DE) ........................................ 101 41 986

(51) Int. Cl.[7] .............................................. B60H 3/06
(52) U.S. Cl. ..................................... 454/158; 55/385.2
(58) Field of Search ......................... 454/158; 55/385.2, 55/467.1

(56) References Cited

U.S. PATENT DOCUMENTS

| 4,344,356 | A | | 8/1982 | Casterton et al. ............ 98/2.11 |
| 4,648,311 | A | | 3/1987 | Slosiarek et al. ............ 98/2.11 |
| 5,342,238 | A | * | 8/1994 | Segerpalm et al. ........... 454/136 |
| 5,468,183 | A | * | 11/1995 | Hahn ......................... 454/136 |
| 5,921,619 | A | | 7/1999 | Cederberg et al. ........ 296/190.09 |
| 6,062,975 | A | * | 5/2000 | Knudtson ..................... 454/138 |
| 6,217,439 | B1 | * | 4/2001 | Janeling et al. .............. 454/158 |

FOREIGN PATENT DOCUMENTS

| DE | 196 28 089 A1 | 1/1998 |
| EP | 0 070 636 A2 | 1/1983 |
| EP | 0 169 040 | 1/1986 |
| EP | 0 438 076 B1 | 7/1991 |
| EP | 0 438 076 A2 | 7/1991 |
| EP | 0 513 491 A1 | 11/1992 |
| EP | 0 733 503 A1 | 9/1996 |

* cited by examiner

*Primary Examiner*—Gregory A. Wilson

(57) ABSTRACT

An air filtration system for a vehicle cab has an air recirculation circuit which includes an air recirculation blower arranged in an air recirculation channel system in order to draw air from the cab interior and to blow it back into the cab interior. An air recirculation filter is arranged in the air recirculation flow. In order to reliably avoid contamination of the cab interior during filter changes, the air recirculation filter is located in a portion of an outer wall of the cab roof behind a cover. The cover covers the air recirculation channel system hermetically from the cab exterior. When the cover is opened, the air recirculation filter is accessible from the outside.

5 Claims, 3 Drawing Sheets

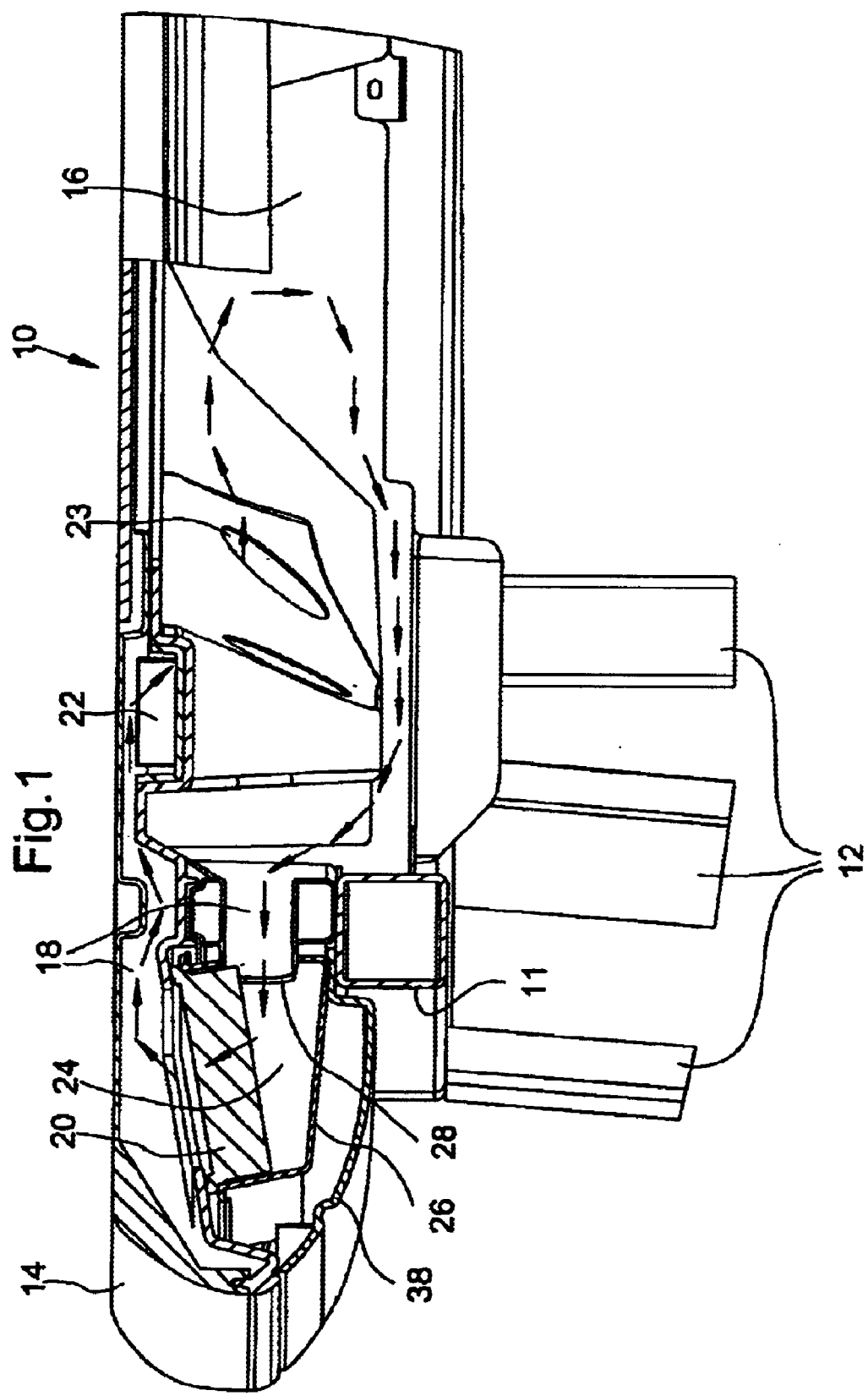

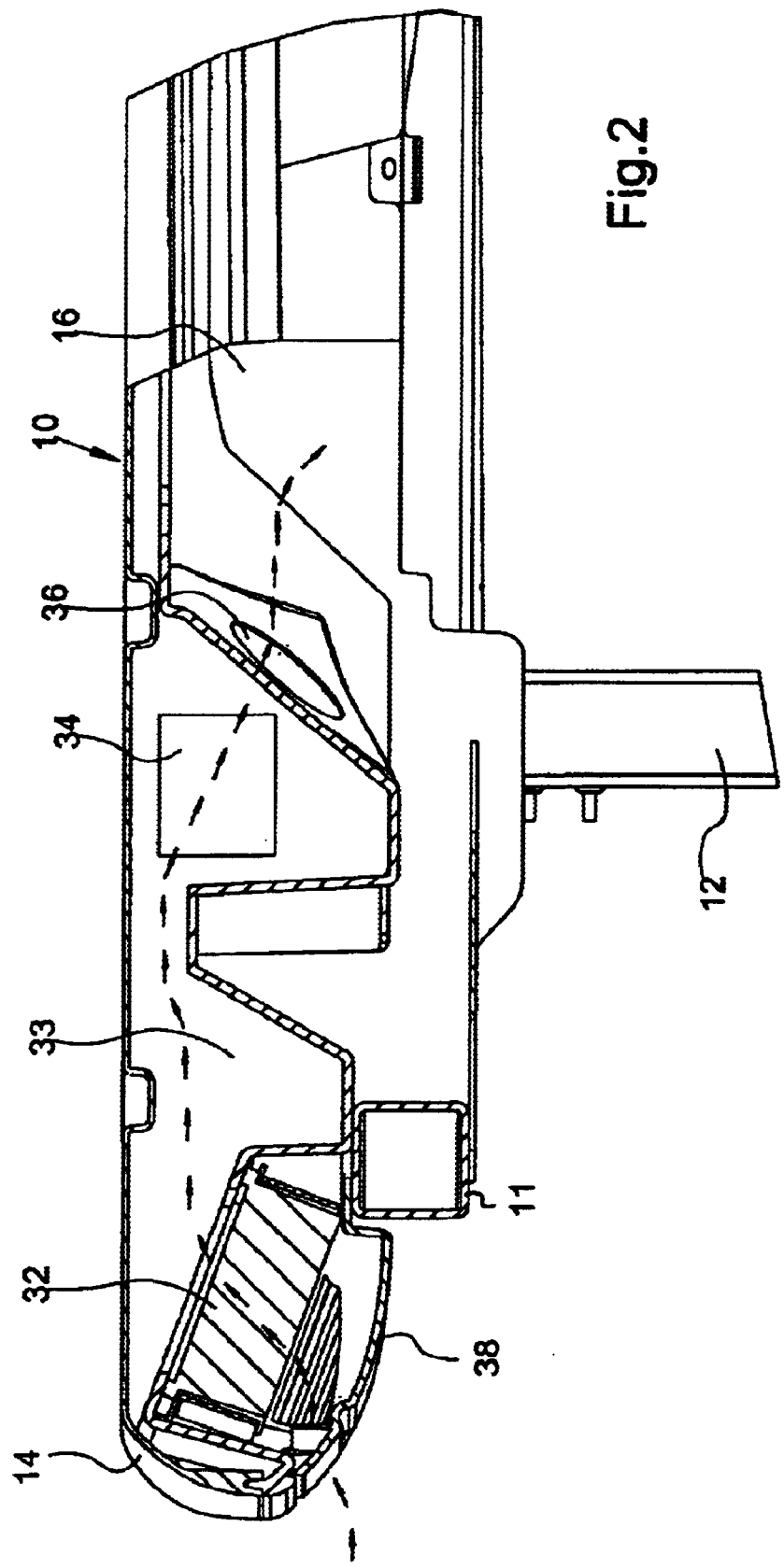

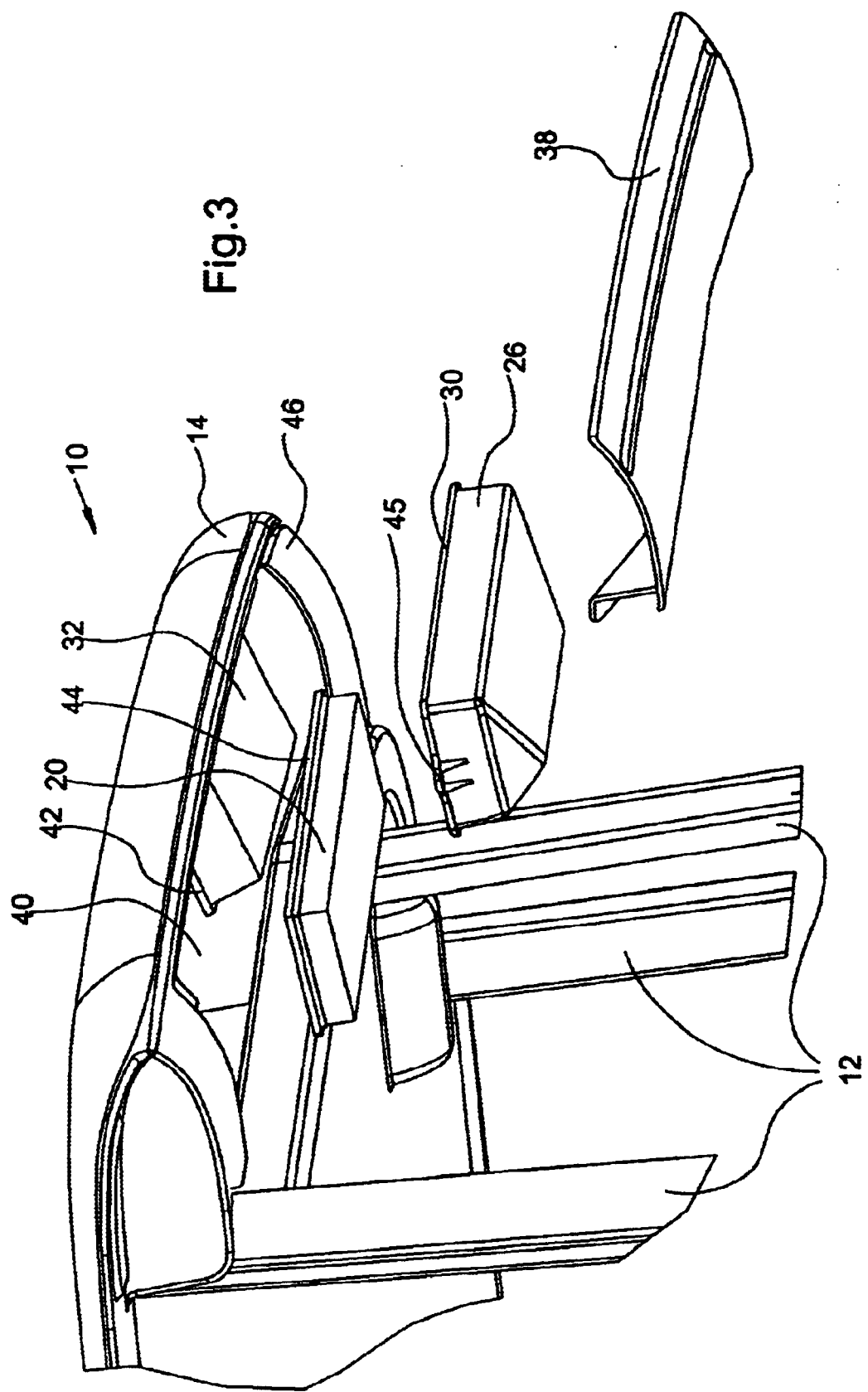

AIR FILTRATION SYSTEM FOR VEHICLE CABS

BACKGROUND OF THE INVENTION

The present invention relates to an air filtration system for a vehicle cab, for such as a utility vehicle cab, such as for an agricultural tractor or harvesting machine.

Vehicle cab air filtration systems include an air recirculation circuit with an air recirculation blower arranged in an air recirculation channel system. The air recirculation blower draws air from the interior of the cab and blows this air back into the interior of the cab. An air recirculation filter is arranged in the air recirculation flow in order to filter contamination from the recirculating air.

In addition to a fresh air supply, air filtration systems for vehicles are frequently provided with an air recirculation circuit which recirculates the cab air, cleans it, heats it and/or air conditions it. Particular in utility vehicles, the air recirculation circuit may be separate from the fresh air supply and includes separate air recirculation filters.

In agricultural vehicles the fresh air carries a considerable load of contaminants such as dust and harvest residues, so that the fresh air filters are exposed to considerable contamination and must be cleaned or replaced frequently. It has therefore been proposed (EP-A-0 438 076) that the fresh air filters be arranged in such a way that they are accessible from the outside of the cab and so that any contamination of the interior of the cab during filter change can be avoided. It is also known to have fresh air filters which are accessible from the outside in the roof region of the vehicle. For example U.S. Pat. No. 4,648,311 describes a fresh air filter that is arranged in the side projection of the vehicle roof on a support element that can be pivoted downward about an axis for a filter change.

On the other hand, the air recirculation filters are generally not exposed to a high degree of contamination, but mainly filter out of the recirculated air the exhaust gases that have penetrated into the cab as well as cigarette smoke from an operator. Therefore, the service and replacement intervals for air recirculation filters are relatively long. Air recirculation filters are arranged inside the cab in corresponding flow channels and are accessible from the interior of the cab after removing sheathing components, covers and the like, and can be serviced and replaced such as described in U.S. Pat. No. 4,344,356. Due to the low degree of contamination no significant contamination of the interior of the cab occurs during service and filter change.

It has been shown, however, that in spite of the low degree of dirt, an air recirculation filter change within the cab can be problematical. In particular, if the vehicle is used in a toxic environment, such as during spraying with toxic spray material, toxic particles can penetrate into the cab. For example, the operator may carry such particles on clothing or shoes. Such toxic particles are filtered out of the recirculated cab air by the air recirculation filter and collect on the air recirculating filter. During filter change these particles can then penetrate into the interior of the cab.

SUMMARY

Accordingly, an object of this invention is to provide an air filtration system which avoids contamination of the interior of the cab during a filter change.

An air filtration system includes an air recirculation circuit, which includes a air recirculation blower arranged in an air recirculation channel system. The blower draws air from the interior of the cab and blows it back into the interior of the cab. An air recirculation filter is arranged in the air flow conducted through the air recirculation channel. According to the present invention, the air recirculation filter is arranged in a portion of an outer wall of the cab roof behind a cover element. The cover hermetically closes the region of the air recirculation channel in which the air recirculation filter is located against the outside of the cab. The cover element can be removed or cleaned from the outside of the cab wall, so that the air recirculation filter is accessible from the outside.

With this air filtration system it is possible to access a contaminated air recirculation filter during filter service or a filter change from the outside. Contamination of the interior of the cab by toxic spray media (pesticides) and the like can be avoided reliably. A utility vehicle equipped with an air filtration system according to the invention thereby offers an absolute protection during spraying with toxic spray media. Furthermore, the air filtration system according to the invention offers very good accessibility to the air recirculation filter for the service and replacement of the filter.

Since the air recirculation circuit is closed air tight to the outside by the cover, no fresh air can penetrate into the cab over the air recirculation system.

Preferably, the cover closes an opening in a projection which projects to the side of the cab roof. The air recirculation filter is arranged behind the opening and is accessible from the outside when the cover is removed from the outer wall of the cab.

Preferably, the cover covers an opening on the underside of the sideways projection of the cab roof to assure good accessibility. For service operations or a filter change the cover can then be comfortably removed from below.

Preferably, the air recirculation filter is covered by a cover. The cover includes an opening through which one side of the air recirculation filter is connected with the air recirculation channel. This one side is, for example, the air inlet side of the air recirculation filter. Thereby, the covering forms a part of the air recirculation channel wall that conducts the recirculated air. Thereby, entry of fresh air from the outside is prevented.

Preferably, an air recirculation filter and a fresh air filter can be accommodated alongside each other in the roof of the cab, in particular in a projection of the roof of the cab. The section of the air recirculation channel in which the air recirculation filter is arranged is closed by a cover against the surroundings, while a fresh air channel in which the fresh air filter and the fresh air blower are arranged is connected with a fresh air inlet through which fresh air is drawn from the exterior of the cab. The fresh air inlet may be configured as a separate cover provided with inlet slots. This configuration simplifies the service operations and the filter changes which may be performed together if necessary for both filter types.

Preferably, the air recirculation filter and the fresh air filter are positioned next to each other in a fore and aft manner in a sideways projection of the cab roof.

Furthermore, the access to both types of filters is simplified by a single sheathing component which is attached to the outer contour of the cab and which covers the air recirculation filter insert and the fresh air filter insert.

BRIEF DESCRIPTION OF THE DRAWINGS

FIG. 1 is a partial sectional view of a portion of a vehicle cab with an air recirculation circuit according to the invention and viewing in a direction transverse to a fore and aft axis of the vehicle;

FIG. 2 is a cross section of the roof region of a vehicle cab similar to FIG. 1, but offset and parallel thereto;

FIG. 3 is a perspective exploded view of the ventilation arrangement according to the invention.

DETAILED DESCRIPTION

Referring to FIG. 1, a vehicle cab includes a roof 10. The roof 10 includes a support structure composed of roof beams 11 which are carried by corner posts and side posts 12 of the cab. The roof 10 extends to the side beyond the cab contour defined by the corner and side posts 12 and thereby forms a roof projection or roof overhang 14.

The roof 10 includes an air recirculation circuit of an air filtration system. The direction of air flow through air circulation in the air recirculation circuit is indicated by arrows. The air flows from the cab interior 16 into an air recirculation channel 18 and flows through an air recirculation filter 20. An air recirculation blower 22 blows the recirculated air through one or more inlet openings 23 back into the interior of the cab 16. On the inlet side 24 of the air recirculation filter 20 a removable cover 26 encloses the air recirculation guide channel 18. The cover 26 has an air inlet opening 28 through which air can flow from the cab interior 16 to the air recirculation filter 20. The cover 26 covers the air recirculation filter 20 and hermetically seals the air recirculation guide channel 18 in the installed condition by means of an encircling seal 30, so that no fresh air from the outside of the cab can penetrate into the air recirculation channel circuit. When the cover 26 is removed the air recirculation filter 20 is accessible from the outside. Filter 20 may be arranged in a cartridge and may be configured as a filter insert which can be removed from the roof region, serviced and/or changed.

FIG. 2 shows a fresh air supply which conducts air in the direction of the arrows. Fresh air enters through air entry slots that are formed on the underside of the roof projection 14, flows through a fresh air filter 32 and a fresh air channel 33 and is blown by means of a fresh air blower 34 through inlet openings 36 into the cab interior 16. The supply of fresh air into the cab interior 16 can be controlled or shut off in the usual manner by appropriate means, for example, by manually operated flaps (not shown). The fresh air filter 32 can also be configured as a cartridge and is accessible and can be removed from the outside for service or filter change operations.

Referring now to FIG. 3, a cavity 40 is formed in a lower portion of the roof projection 14. Cavity 40 may be closed by a sheathing component 38. A fresh air filter 32 is mounted in cavity 40. Fresh air filter 32 is connected in an air tight manner to the fresh air channel 33 by an encircling seal 42 and can be removed for service operations and filter change. An air recirculation filter 20 (shown as removed) may be positioned alongside fresh air filter 32, and may be inserted into the cavity 40 and into the air recirculation channel 18 in an air tight manner by means of an encircling seal 44. FIG. 3 also shows the cover 26 (which in its installed condition covers the air recirculation filter 20) in a removed position. The cover 26 may be used to hermetically seal the air recirculation channel 18 against entry of any fresh air. The cover 26 includes fastening means 45 for fastening to the air recirculation channel 18.

When the two filters 20, 32 and the cover 26 are installed in the roof projection 14, the cavity 40 can be closed by the sheathing component 38 which conforms to the outer contour of the cab. Fresh air is conducted over air inlet slots that are arranged in a separate removable covering 46.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An air filtration system for a vehicle cab having an air recirculation circuit including an air recirculation blower arranged in an air recirculation channel system, the blower drawing air from an interior of the cab and blowing it back into the interior of the cab, and including an air recirculation filter through which the air flows, characterized by:

the cab having a roof with an outer wall and a cover which isolates the air recirculation channel system from the exterior of the cab, the air recirculation filter being arranged in a portion of the outer wall behind the cover, and the air recirculation filter being accessible from outside of the cab when the cover is opened;

the cab roof including a sideways projection, and the cover and the air recirculation filter being located in a portion of the projection, the sideways projection including a cavity formed on an underside thereof; and a sheathing component for closing the cavity.

2. The air filtration system of claim 1, characterized by:

the air recirculation filter is covered by the cover, and the cover has an opening which connects one side of the air recirculation filter with the air recirculation channel.

3. An air filtration system for a vehicle cab having an air recirculation circuit including an air recirculation blower arranged in an air recirculation channel system, the blower drawing air from an interior of the cab and blowing it back into the interior of the cab, and including an air recirculation filter through which the air flows, characterized by:

the cab having a roof with an outer wall and a cover which isolates the air recirculation channel system from the exterior of the cab, the air recirculation filter being arranged in a portion of the outer wall behind the cover, and the air recirculation filter being accessible from outside of the cab when the cover is opened;

the air recirculation filter and a fresh air filter are arranged alongside each other in a projection of the cab roof and in a portion of the air recirculation channel system, the cab roof being closed to an exterior of the cab by a cover; and a fresh air filter and a fresh air blower are arranged in a fresh air channel which is connected with a fresh air inlet through which fresh air is drawn from the outside of the cab.

4. The air filtration system of claim 3, wherein:

the air recirculation filter and the fresh air filter are positioned next to each other in a series manner with respect to a direction of air flow, and in a sideways projection of the cab roof.

5. The air filtration system of claim 3, wherein:

the outer wall includes a sheathing component which covers the filters.

* * * * *